United States Patent [19]

Hauschildt et al.

[11] 4,238,319

[45] Dec. 9, 1980

[54] PROCESS FOR ISOMERIZATION OF PETROLEUM HYDROCARBONS

[75] Inventors: F. William Hauschildt, Dune Acres; Ralph J. Bertolacini, Chesterton, both of Ind.

[73] Assignee: Standard Oil Company (Indiana), Chicago, Ill.

[21] Appl. No.: 32,268

[22] Filed: Apr. 23, 1979

[51] Int. Cl.³ .............................................. C10G 35/08
[52] U.S. Cl. ..................................... 208/138; 585/739
[58] Field of Search ......................... 208/138; 585/739

[56] References Cited

U.S. PATENT DOCUMENTS

| | | | |
|---|---|---|---|
| 3,190,939 | 6/1965 | Benesi | 585/739 |
| 3,527,835 | 9/1970 | Benesi | 585/739 |
| 3,644,200 | 2/1972 | Young | 208/138 |
| 3,673,267 | 6/1972 | Chen et al. | 585/739 |
| 3,679,575 | 7/1972 | Bertolacini | 208/138 |
| 4,153,637 | 5/1979 | de Vleesschauwer et al. | 208/138 |

*Primary Examiner*—C. Davis
*Attorney, Agent, or Firm*—William C. Clarke; William T. McClain; William H. Magidson

[57] ABSTRACT

Isomerization process for petroleum light hydrocarbons with a boiling point within the range of from about 100° F. (38° C.) to about 210° F. (99° C.) wherein said process comprises contacting said hydrocarbons with a catalyst consisting essentially of an ultrastable, large pore crystalline zeolite aluminosilicate material containing less than 1 (wt)% alkali metal and characterized by well-defined hydroxyl infra-red bands and a maximum unit cubic cell dimension of 24.55 Å and a metal component selected from the metals, oxides or sulfides of the Group VIII elements of the Periodic Table, under suitable isomerization conditions.

5 Claims, 2 Drawing Figures

PROCESS FOR ISOMERIZATION OF PETROLEUM HYDROCARBONS

BACKGROUND OF THE INVENTION

This invention pertains to a catalytic isomerization process for light hydrocarbons such as pentane, hexane and heptane, wherein a hydrocarbon stream contacts a catalyst composition containing an ultrastable, large pore, crystalline zeolitic aluminosilicate material and a Group VIII metal, metal oxide or sulfide under suitable isomerization conditions.

Natural straight run gasoline, i.e., naphthas, contain chiefly normal paraffins such as normal pentane and normal hexane, which have relatively low octane numbers. Representative octane numbers of pentanes and hexanes are set forth below in Table I.

TABLE I

Octane Numbers of Pentanes and Hexanes

| Paraffin | Octane Number Research Clear | Motor Clear |
|---|---|---|
| n-Pentane | 61.7 | 61.9 |
| 2-Methylbutane | 92.3 | 90.3 |
| 2,2-Dimethylbutane | 91.8 | 93.4 |
| 2,3-Dimethylbutane | 103.5 | 94.3 |
| 2-Methylpentane | 73.4 | 73.5 |
| 3-Methylpentane | 74.5 | 74.3 |
| n-Hexane | 24.8 | 26.0 |

It is therefore of great importance to convert these low octane components to their higher octane counterparts in order to supply the present and future requirements for production of gasoline with reduced lead content or no lead content at all. Accordingly, a considerable number of materials have been proposed as catalysts for isomerization of hydrocarbons in the petroleum industry and there is need for more effective catalysts.

It is well recognized in the prior art that the isomerization reaction is unusual in that the thermodynamic equilibrium between the various isomers is the most important feature in determining the catalyst which can be applied most successfully to the process. This is because the equilibrium concentration is very dependent upon the reaction temperature. The effect of temperature is particularly apparent in the case of light hydrocarbons such as the hexanes.

It is well-known that if the isomerization reaction is carried out at high temperatures, the doubly branched isomers are much less favored than singly branched isomers or n-hexane whereas at temperatures below 300° F. there is a rapid increase in the equilibrium concentration of the high octane isomer 2,2-dimethylbutane. (J. A. Ridgway, Jr. and W. Schoen, ACS Symposium, Div. of Petroleum Chemistry, Boston, April 5–10, 1959, A-5-A-11) Thermodynamic equilibrium curves therefore provide criteria as to catalysts which provide near equilibrium conversions at the lowest possible reaction temperature. FIG. 1 shows the composition-temperature equilibrium curves of the vapor phase hexane isomers as determined by Ridgway and Schoen. The relative mole percent equilibrium of each component of the stream indicates the relative catalyst activity. The curves indicate the low intermediate temperature range of from about 350° to about 650° F., with a mid-point temperature of about 550°–600° F., combines the advantages of high isomer yield with lower investment in equipment.

SUMMARY OF THE INVENTION

A novel process for isomerizing petroleum light hydrocarbons with a boiling point range of from 100° F. to 210° F. wherein the said hydrocarbons are contacted with a catalyst consisting essentially of an ultrastable, large pore crystalline zeolitic aluminosilicate material containing less than about 1 (wt%) alkali metal, and a metal component selected from the metals, oxides, or sulfides of the Group VIII elements of the Periodic Table and wherein the said zeolitic aluminosilicate material is characterized by well-defined hydroxyl infra-red bands near 3700 cm$^{-1}$ and near 3625 cm$^{-1}$ and a maximum cubic cell dimension of 24.55 Å, and wherein the said process is accomplished by contacting the said catalyst with the said petroleum hydrocarbon stream under suitable isomerization conditions.

DESCRIPTION OF THE PRIOR ART

Processes for the isomerization of petroleum light hydrocarbons in the prior art have typically used an acidic catalyst. In the earlier processes, strongly acidic Friedel-Crafts catalysts such as acid-promoted aluminum chloride were used. Later processes required zeolite molecular sieves containing a catalytically active metal such as rhodium (U.S. Pat. No. 3,236,903); a Y-type crystalline zeolite containing an elemental metal of Group VIII of the Periodic Table (U.S. Pat. Nos. 3,236,761 and 3,236,762); a synthetic mordenite containing highly-dispersed platinum or palladium in the presence of hydrogen (U.S. Pat. No. 3,527,835; U.S. Pat. No. 3,299,153); stabilized Y-sieve hydrogen zeolite compositions (U.S. Pat. No. 3,354,077); decationized Y-type crystalline zeolite (IEC, 53, Sept., 1961, 733–736; Rabo et al., Paper No. 104, Sec. Int. Cong. Catalysis, Paris, France, 1960; U.S. Pat. No. 3,130,006).

The use in hydrocracking of an ultrastable, large-pore crystalline aluminosilicate material which includes a Group VI and a Group VIII metal or metal oxide (U.S. Pat. No. 4,054,539), or Group VIII metals, oxides or sulfides or ultrastable, large pore crystalline aluminosilicate material (U.S. Pat. No. 3,677,972) is well-known.

However, the markedly superior isomerization activity of low molecular weight paraffins by an ultrastable, large pore crystalline aluminosilicate zeolite containing less than 1 (wt.)% alkali metal and characterized by well-defined hydroxyl infra-red bands and a maximum unit cubic cell dimension of 24.55 Å and a metal component selected from metals, oxides or sulfides of the Group VIII elements of the Periodic Table has not been previously known. It has been found in the present invention that the hereinused catalyst is a superior catalyst compared to other commonly accepted and widely used catalysts which use the synthetic fausite Y type or modified zeolite type.

DETAILED DESCRIPTION OF THE INVENTION

Figure 1:
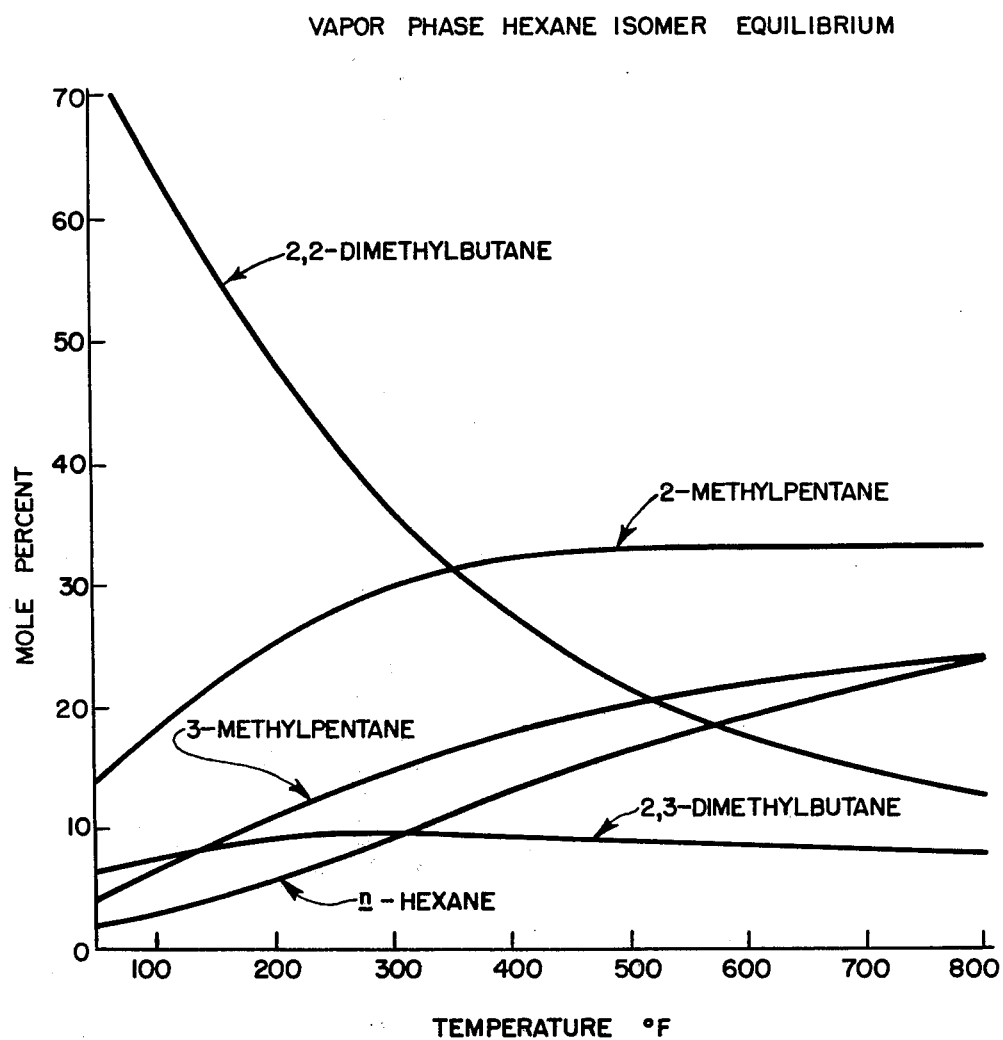

This invention relates to a catalytic process for conversion of hydrocarbons wherein the said catalyst comprises an ultrastable, large pore, crystalline zeolitic aluminosilicate zeolite containing less than 1 (wt.)% alkali metal and a metal component selected from the metals, metal oxides or sulfides of Group VIII of the Periodic Table of Elements and mixtures thereof. The pertinent Periodic Table of Elements may be found on the inside of the back cover of the *Handbook of Chemistry And Physics,* 45th Edition, Robert C. Weast, editor, Chemical Rubber Company, Cleveland, Ohio (1964). The preferred Group VIII metals are platinum and palladium. The platinum or palladium can be present as the metal, metal oxide or sulfide in an amount within the range of from about 0.1 to 10 weight percent expressed as the metal and based upon the weight of the catalytic composition. The said zeolite is characterized by well-defined hydroxyl infra-red bands near 3700 cm$^{-1}$ and near 3625 cm$^{-1}$ and a maximum cubic cell dimension of 24.55 Ångstroms (Å).

Certain naturally occurring and synthetic aluminosilicate materials such as faujasite, mordenite, X and Y-type aluminosilicate materials are commercially available and are effective isomerization catalysts. These aluminosilicate materials may be characterized and adequately defined by their X-ray diffraction patterns and compositions. Characteristics of such aluminosilicate materials and patterns for preparing them have been presented in the chemical art. They exist as a network of relatively small cavities which are interconnected by numerous pores which are smaller than the cavities. These pores have an essentially uniform diameter of the narrowest cross-section. Basically, the network of cavities is a fixed three-dimensional and ionic network of silica and alumina tetrahedra. These tetrahedra are cross-linked by the sharing of oxygen atoms. Cations are included in the crystalline structure to preserve the eletrovalence of tetrahedra. Examples of such cations are metal ions, ammonium ions, and hydrogen ions. One cation may be exchanged either entirely or partially for another by means of techniques which are well known to those skilled in the art.

In brief therefore, the use of crystalline aluminosilicates as elements in isomerization processes is well-known and is documented in many sources. Synthetic faujasites such as Linde X and Y zeolites having pore openings 8–9 Å in diameter have been of particular interest because they readily admit large hydrocarbon molecules. These zeolites, when holding suitable cations and properly pretreated, are extremely active catalysts for acid-catalyzed reactions.

The catalytic behavior of the faujasites depends greatly on the nature and distribution of the cations. Zeolites holding univalent cations are usually inactive, while those with divalent or polyvalent cations or protons, which are held mainly as hydroxyl groups, are quite active. One of the most active forms is the so-called "decationized" Y zeolite. Decationized Y zeolite is made by cation-exchanging sodium-Y zeolite with an ammonium salt solution to produce (NH$_4$)Y, subsequently heating the (NH$_4$)Y to produce (H+)Y, which yields decationized Y plus water upon heating. Further heating dehydrates the decationized Y zeolite. U.S. Pat. No. 3,130,006 teaches preparation of decationized Y sieves by ion-exchanging a substantial portion of the metal cations with NH$_4$+, followed by heating to 350°–600° C. and preferably between 475° C. and 600° C., the temperature being critical in removing the ammonia.

Although decationized Y zeolite has been known to be highly active, decationized zeolites were also known to be markedly less stable than the cationic forms, particularly in their ability to retain crystallinity and surface area after contact with water or water vapor at high temperatures and also generally in their ability to withstand heating at high temperatures. X zeolites were known to be less stable than Y zeolites.

The ultrastable, large pore, crystalline zeolitic aluminosilicate material employed in the catalyst of this invention is extremely important. It is an ultrastable material, that is, it is stable to exposure to elevated temperatures and stable to repeated wetting-drying cycles. An example of ultrastable, large pore, crystalline zeolitic aluminosilicate material that is employed in the catalyst of this invention is Z-14 ultrastable zeolite, which is described in U.S. Pat. No. 3,293,192 as a fluid cracking catalyst. The preferred material may be prepared by methods of preparation disclosed in U.S. Pat. No. 3,449,070 and by Procedure B presented in the paper "A New Ultra-Stable Form of Faujasite" by C. V. McDaniel and P. K. Maher, presented at a Conference on Molecular Sieves held in London, England in April 1967. The paper was published in 1968 by the Society of Chemical Industry.

The stability of ultrastable, large pore, crystalline zeolitic aluminosilicate material may be demonstrated by its surface area after calcination at 1725° F. After a two-hour calcination at 1725° F., a surface area that is greater than 150 square meters per gram (M$^2$/gm.) is retained. Moreover, the stability is further demonstrated by its surface area after a steam treatment with an atmosphere of 25% steam at a temperature of 1525° F. for 16 hours. The surface area after this steam treatment is greater than 200 m$^2$/gm.

The ultrastable, large pore, crystalline zeolitic aluminosilicate material exhibits extremely good stability towards wetting, which is defined as that ability of a particular aluminosilicate material to retain surface area or nitrogen adsorption capacity after contact with water or water vapor. A form of the ultrastable, large pore, crystalline zeolitic aluminosilicate material containing about 2% sodium exhibits a loss in nitrogen adsorption capacity that is less than 2% per wetting when tested for stability to wetting.

The ultrastable, crystalline zeolitic aluminosilicate material is a large pore material. By large pore material is meant material that has pores which are sufficiently large to permit the passage thereinto of benzene molecules and larger molecules, and the passage therefrom of reaction products. For use in isomerization processes, it is preferred to employ a large pore, crystalline zeolitic aluminosilicate material having a pore size of at least 8 to 10 Angstrom units (Å). This ultrastable, large pore, crystalline zeolitic aluminosilicate material possesses such a pore size.

The cubic cell dimension of ultrastable, large pore, crystalline zeolitic aluminosilicate material is within the range of about 24.20 Å to about 24.55 Å. This range of values is below those values shown in the prior art for X-type, Y-type and decationized aluminosilicates. The hydroxyl infrared bands obtained with the ultrastable, large pore, crystalline zeolitic aluminosilicate materials includes a band near 3750 cm$^{-1}$, a band near 3700 cm$^{-1}$, and a band near 3625 cm$^{-1}$. While the latter two bands appear to be characteristic of the ultrastable, large pore, crystalline zeolitic aluminosilicate material of the catalytic composition employed in this invention, it is quite possible that they might appear in the infrared spectra of a decationized Y-type aluminosilicate material, if that aluminosilicate material were to be subjected to the proper treatment.

It is believed that the ultrastable, large pore, crystalline zeolitic aluminosilicate material of the catalyst of this invention can be identified properly by the hydroxyl infrared bands near 3700 cm$^{-1}$ and near 3625 cm$^{-1}$, particularly the former, when considered in conjunction with characteristically small cubic unit cell dimension. For example, the identification or description will distinguish the ultrastable, zeolitic aluminosilicate material from the "high-silica" faujasites described in Dutch Patent Application No. 6,707,192, which have the smaller cubic unit cell but do not exhibit the 3700 cm$^-$ and 3625 cm$^{-1}$ infrared bands. While unstable decationized Y-type aluminosilicate materials may provide hydroxyl infrared bands near 3700 cm$^{-1}$, if they were to receive the proper treatment, they do not exhibit the appropriate smaller cubic unit cell dimension that is characteristic of the ultrastable, large pore, crystalline aluminosilicate material.

The ultrastable, large pore, crystalline zeolitic aluminosilicate material, as employed in the isomerization catalyst of this invention, contains less than 1 weight percent alkali metal such as sodium.

It is believed, therefore, that the ultrastable, large pore, crystalline zeolitic aluminosilicate material may be adequately and accurately identified, characterized, and described by (1) its cubic unit cell dimension, (2) its specific hydroxyl infrared bands, and (3) its low sodium content. The ultrastable, large pore, crystalline zeolitic aluminosilicate material used in the isomerization catalyst of this invention is not the same material as the hydrogen-form and decationized Y-type aluminosilicate molecular sieve. The ultrastable zeolitic aluminosilicate material has different cubic unit cell dimensions and different hydroxyl infrared bands. Nevertheless, it is an extremely active catalytic material having the additional benefit of remaining active even after being steamed.

As a preferred catalyst, the ultrastable, large pore, crystalline zeolitic aluminosilicate material has deposited thereon a suitable isomerization component which may be deposited by impregnation or by mixing the ultrastable, large pore, crystalline zeolitic aluminosilicate material with solutions of the isomerization component during manufacture. A preferred isomerization component is a palladium chloride or platinum chloride solution which provides an especially durable long-life catalyst particularly suited for isomerizing light hydrocarbons such as pentane, hexane and heptane. Typically, the catalyst contains from about 0.1 to 10 weight percent palladium and less than about 1 weight percent alkali metal, calculated as the element and based upon the total catalyst weight.

The hydrocarbon feedstock to the process may boil in the range between about 100° F. and about 210° F. When acting to maximize high-octane components, the feedstock preferably has an end-point not greater than about 210° F. Typically such a feedstock will comprise pentane, hexane and heptane predominantly. Suitable isomerization conditions comprise a temperature within the range of from about 350° F. to about 650° F., a pressure from about 200 psig to about 600 psig, WHSV of from about 0.5 to about 40, a hydrogen to hydrocarbon ratio of from about 2 to about 10, and a LHSV of from about 0.4 to about 3.0.

In order to facilitate a clear understanding of the invention, i.e., the process for isomerizing light hydrocarbons and the catalyst for said isomerization, the following specific embodiments are described in detail. It should be understood, however, that the detailed expositions of the process and catalyst, while indicating preferred embodiments, are given by way of illustration only since various changes and modifications within the spirit and scope of the invention will become apparent to those skilled in the art from this detailed description.

EXAMPLE I

Catalyst 1923-116 was prepared by repeatedly ion-exchanging Davison soda-form ultrastable sieve as follows:

250 grams of Davison U.S. Sieve with well characterized hydroxyl infra-red bands at 3700 cm$^{-1}$ and 3625 cm$^{-1}$, were ion-exchanged three times with separate batches of 150 grams $(NH_4)_2SO_4$ dissolved in two liters of distilled water. After the final exchange and water wash, the sieves were dried three hours at 250° F. and calcined three hours at 1000° F. The resulting sample had the following inspection:

| | |
|---|---|
| Sodium Content, % | 0.68 |
| Surface Area, m$^2$/gr | 532 |
| Unit Cell Size, Å | 24.52 |

200 Grams of the ion-exchanged powder was impregnated with a palladium solution made as follows:

2.0 Grams of $PdCl_2$ was dissolved in an excess of aqua regia and evaporated to near dryness. The residue was dissolved in 220 ml of distilled water. The impregnated powder was dried for three hours at 250° F. (121° C.), blended with 4 (wt)% Sterotex, pelleted $\frac{1}{4}'' \times \frac{1}{4}''$, and calcined for three hours at 1000° F. (538° C.). The resulting catalyst was ground to 20/40 mesh (U.S. Sieve) and was made to contain 0.6 (wt)% Pd.

EXAMPLE II

The catalyst prepared by the procedure of Example I was pretreated for three hours at 400° F. (204° C.) in flowing hydrogen, one cubic foot per hour. The temperature was gradually increased to 930° F. (500° C.) and held overnight at the same hydrogen flow rate.

A commercial catalyst made by Linde, containing 0.6 (wt)% palladium on Linde Y-type sieve, Linde SK120, for vapor phase isomerization, was also pretreated by the same procedure.

A 100 hour run was made using both catalysts. Feedstock was Phillips normal hexane with the following properties.

| | Wt. % |
|---|---|
| 2-Methylpropane and Dimethyl Butane | 0.04 |
| 3-Methylpropane | 0.46 |
| n-Hexane | 98.50 |
| Methylcyclopentane | 1.00 |
| Sulfur, ppm | 0.2–0.6 |

Run conditions were:

| | |
|---|---|
| Pressure, psig | 400 |
| H$_2$/HC Ratio | 5.5 |
| Temperature °F. | 550 (288° C.) |
| Catalyst Weight (grams) | 16.0 |
| WHSV | 1.0 |
| LHSV | 0.8 |

Comparative data resulting from the two catalysts are shown in Table II.

TABLE II n-Hexane Isomerization Data
Yields in Wt %

| Product | Linde SK120 | 1923-116 |
|---|---|---|
| Pentane | 0.04 | 1.57 |
| 2,2-Dimethylbutane | 5.02 | 13.79 |
| 2,3-Dimethylbutane | 3.38 | 8.32 |
| 2-Methylpentane | 28.07 | 32.09 |
| 3-Methylpentane | 18.14 | 23.05 |
| n-Hexane | 43.94 | 20.44 |
| Methyl Cyclopentane +Cyclohexane | 1.11 | 0.70 |
| n-Heptane | 0 | 0.05 |
| % of 2,2 Dimethylbutane Equilibrium | 27 | 74 |

Percent approach to equilibrium is calculated by (A) adding total $C_6$ (ex-cyclohexane) weight percent and dividing 2,2-dimethylbutane weight percent by total $C_6$ weight percent, followed by picking off on the equilibrium concentration curve (FIG. 1) the equilibrium concentration at the given temperature, and dividing (A) by the equilibrium concentration.

The data show that 1923-116 produces more 2,2-dimethylbutane at one space velocity and 550° F. than the commercial catalyst. The 1923-16 catalyst is about twice as active as Linde SK120. The 1923-116 catalyst reaches 74% of equilibrium for 2,2-dimethylbutane whereas the Linde SK120 reaches 27% of equilibrium under the above conditions.

EXAMPLE III

The procedure of Example II was repeated with a WHSV of 2 and 600° F. (316° C.). The results were as follows:

TABLE III

Yields in Wt %

| | Linde SK120 | 1923-116 |
|---|---|---|
| Pentane | 0.12 | 1.34 |
| 2,2-Dimethylbutane | 13.29 | 12.85 |
| 2,3-Dimethylbutane | 7.41 | 7.23 |
| 2-Methylpentane | 31.66 | 28.70 |
| 3-Methylpentane | 22.18 | 19.20 |
| n-Hexane | 21.31 | 18.07 |
| | 95.85 | 86.05 |
| Methyl Cyclopentane +Cyclohexane | 1.19 | 0.19 |
| n-Heptane | 0.13 | 0.26 |
| % of 2,2-Dimethylbutane Equilibrium | 8.15 | 87.5 |

Equilibrium concentration for Linde SK120, Table III, was calculated as follows: $13.29 \div 95.85 \times 100 = 13.86$. 2,2-Dimethylbutane concentration from Table I at 600° F. is 17.00. $13.86 \div 17.00 \times 100 = 81.5$.

Catalyst 1923-16 has an increased activity at 600° F. and 2 WHSV, as does catalyst Linde SK120. However 1923-16 still maintains an increased activity over Linde SK120 with a WHSV of 2.

COMPARATIVE EXAMPLE IIIA

A comparison with a commercial catalyst specifically designed for isomerization of $C_5$ and $C_6$ paraffins was made. The catalyst was Linde Catalyst MB5390, a noble metal (palladium) on a modified zeolite support. Feedstock was Phillips normal hexane of the following analysis:

| | Wt. % |
|---|---|
| n-Hexane | 96.6 |
| 3-Methylpentane | 0.7 |
| Methylcyclopentane | 2.3 |
| Benzene | 0.4 |

The feed was dried by passage through molecular sieves. The catalyst received a specific treatment before use, as recommended by the manufacturer, Linde Molecular Sieves, Union Carbide Corp., New York, N.Y. This treatment is used to remove water and consists of heating the catalyst in a stream of dry hydrogen from room temperature to 932° F. (500° C.) in 10 hours, holding the catalyst at temperature for 16 hours and then changing the temperature to the operating temperature.

Run conditions and resulting data are in Table IV.

TABLE IV

Isomerization of $C_6$ Paraffins
Commercial Palladium Catalyst

| Run Hours | Temp. °F. | $H_2$ CF/B | psig | WHSV | % DMB in $C_6$ Output | % DMB Equil. |
|---|---|---|---|---|---|---|
| 35 | 646 | 3119 | 400 | 2.07 | 23.0 | 95.8 |
| 40 | 609 | 3194 | 400 | 2.06 | 21.7 | 85.4 |
| 45 | 599 | 3122 | 400 | 2.08 | 18.5 | 71.7 |
| 50 | 646 | 3403 | 400 | 2.10 | 21.9 | 91.3 |
| 55 | 646 | 3122 | 400 | 2.08 | 22.3 | 92.9 |
| 60 | 647 | 2499 | 400 | 2.13 | 22.4 | 93.7 |
| 65 | 646 | 3024 | 400 | 2.06 | 22.9 | 95.4 |
| 70 | 647 | 2798 | 250 | 2.11 | 20.6 | 86.2 |
| 75 | 647 | 3534 | 250 | 2.06 | 20.3 | 84.9 |
| 80 | 604 | 2295 | 250 | 2.09 | 16.8 | 85.9 |
| 85 | 597 | 3125 | 250 | 2.09 | 15.1 | 57.0 |
| 90 | 653 | 3783 | 400 | 1.01 | 21.7 | 91.2 |
| 95 | 655 | 4046 | 400 | 1.04 | 23.3 | 98.7 |
| 100 | 646 | 2120 | 400 | 4.12 | 15.2 | 63.3 |
| 103 | 633 | 2988 | 400 | 4.16 | 14.5 | 58.2 |
| 108 | 566 | 3328 | 400 | 1.96 | 11.8 | 42.8 |
| 113 | 554 | 2819 | 400 | 2.08 | 6.9 | 24.8 |
| 118 | 639 | 3645 | 400 | 2.04 | 18.9 | 77.8 |
| 123 | 639 | 2521 | 400 | 2.10 | 21.1 | 88.8 |

Figure 2:
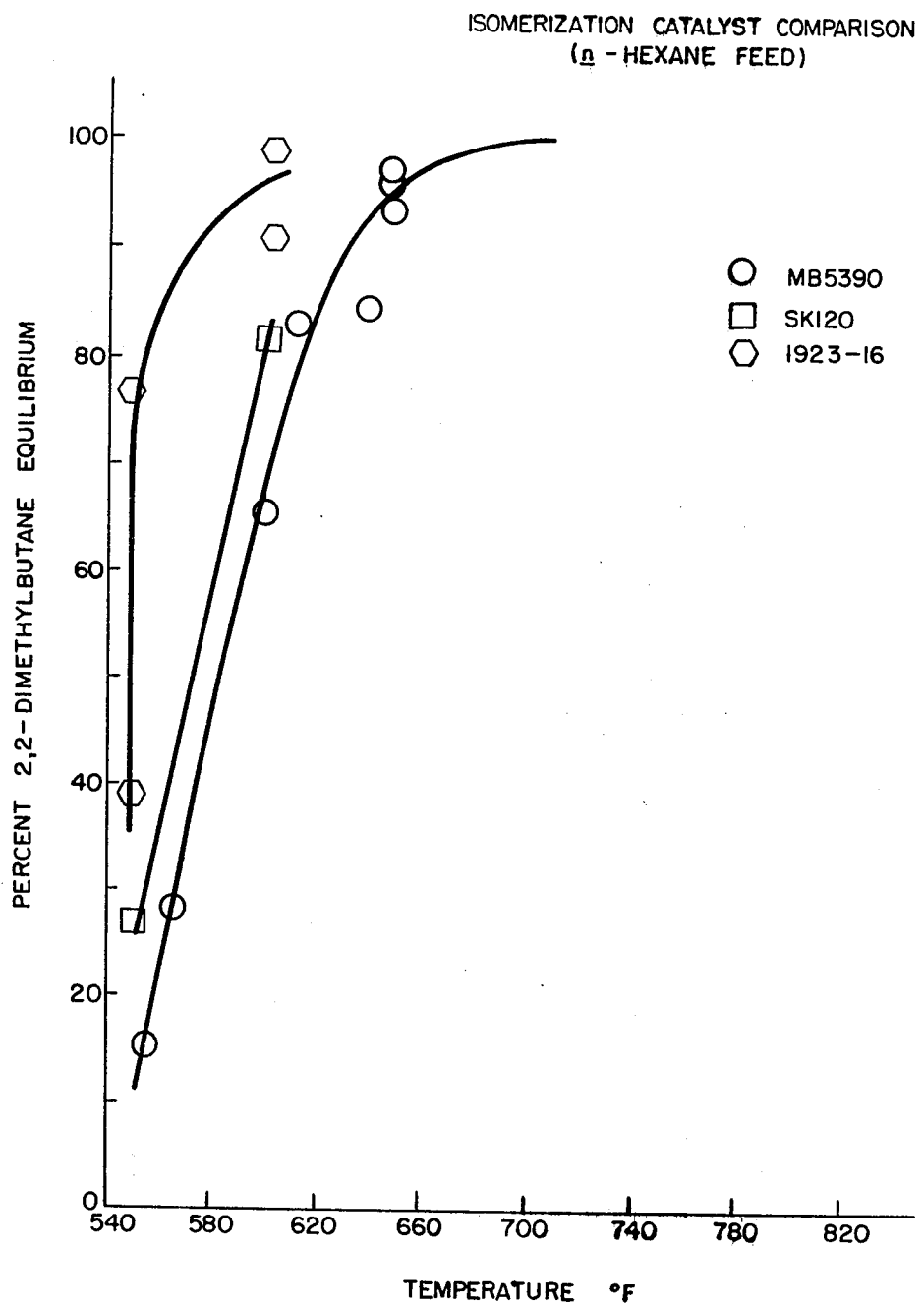

The above data in Examples III and IIIA were plotted as in FIG. 2. Percent dimethylbutane equilibrium was calculated using data supplied by the manufacturer as to the approach to equilibrium (of the formation of dimethylbutanes) of a mixed $C_5-C_6$ feed expressed as "Percent of Equilibrium" with the manufacturer's commercial catalyst. The catalyst of the instant invention, 1923-116, as shown in FIG. 2 converts $C_6$ hydrocarbons at a lower temperature than either commercial catalyst, Linde MB5390 or Linde SK120 to obtain approximately equivalent dimethylbutane equilibrium.

What is claimed is:

1. A process for the isomerization of light hydrocarbons boiling in the range from about 100° F. (38° C.) to about 210° F. (99° C.) which process comprises contacting said hydrocarbons with a catalyst consisting essentially of an ultrastable, large pore crystalline zeolitic aluminosilicate material containing less than 1 weight percent alkali metal calculated as the element and based upon the total catalyst weight and characterized by well-defined hydroxyl infra-red bands near 3700 cm$^{-1}$ and near 3625 cm$^{-1}$ and a maximum unit cubic cell dimension of 24.55 Å and a metal component selected from the metals, oxides and sulfides of the Group VIII elements of the Periodic Table.

2. The process of claim 1 wherein the concentration of said metal component is within the range of from about 0.1 to 10 weight percent calculated as the element and based upon the total catalyst weight.

3. The process of claim 1 wherein the said metal component is palladium or platinum.

4. The process of claim 1 wherein the said catalyst is contacted with a petroleum hydrocarbon stream under suitable isomerization conditions comprising a temperature within the range of from about 350° F. to about 650° F., a pressure of from about 200 psig to about 600 psig, WHSV of from about 0.5 to about 40, a hydrogen to hydrocarbon ratio of from about 2 to about 10, and a LSHV of from about 0.4 to about 3.0.

5. The process of claim 4 wherein the said hydrocarbons have an end-point not greater than 210° F. (99° C.) and comprise pentane, hexane and heptane predominantly.

* * * * *

UNITED STATES PATENT OFFICE
CERTIFICATE OF CORRECTION

Patent No. 4,238,319      Dated December 9, 1980

Inventor(s) F. William Hauschildt and Ralph J. Bertolacini

It is certified that error appears in the above-identified patent and that said Letters Patent are hereby corrected as shown below:

| Patent Column | Line | |
|---|---|---|
| 2 | 56 | "fausite Y type" should be --faujasite Y-type-- |
| 3 | 24 | "of" should be --at-- |
| 3 | 31 | "of tetrahedra" should be --of the tetrahedra-- |
| 5 | 10 | "$cm^-$" should be --$cm^{-1}$-- |
| 7 | 13 | "2,2 Dimethylbutane" should be --2,2-Dimethylbutane-- |
| 7 | 26 | "1923-16" should be --1923-116-- |
| 7 | 49 | "8.15" should be --81.5-- |

Signed and Sealed this

Tenth Day of March 1981

[SEAL]

Attest:

RENE D. TEGTMEYER

Attesting Officer     Acting Commissioner of Patents and Trademarks